United States Patent
Kim et al.

(10) Patent No.: US 8,619,129 B2
(45) Date of Patent: Dec. 31, 2013

(54) MULTIVIEW AUTOSTEREOSCOPIC DISPLAY DEVICE AND MULTIVIEW AUTOSTEREOSCOPIC DISPLAY METHOD

(75) Inventors: Dae-sik Kim, Suwon-si (KR); Kyung-hoon Cha, Yongin-si (KR); Vladimir Saveliev, Gwangju-si (KR); Yong-jin Choi, Seoul (KR); Jung-young Son, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1260 days.

(21) Appl. No.: 12/041,681

(22) Filed: Mar. 4, 2008

(65) Prior Publication Data

US 2009/0002819 A1    Jan. 1, 2009

(30) Foreign Application Priority Data

Jun. 27, 2007   (KR) .................. 10-2007-0063810

(51) Int. Cl.
*H04N 13/04* (2006.01)
(52) U.S. Cl.
USPC ............................................. 348/51; 348/54
(58) Field of Classification Search
USPC ........... 348/43, 48, 54, 59, E13.022; 382/285
See application file for complete search history.

(56) References Cited

U.S. PATENT DOCUMENTS

| | | | | |
|---|---|---|---|---|
| 5,917,562 A * | 6/1999 | Woodgate et al. | ............... | 349/15 |
| 6,157,396 A * | 12/2000 | Margulis et al. | ............... | 345/506 |
| 6,377,295 B1 * | 4/2002 | Woodgate et al. | ............... | 348/59 |
| 6,437,915 B2 * | 8/2002 | Moseley et al. | ............... | 359/465 |
| 2004/0218245 A1 * | 11/2004 | Kean et al. | ..................... | 359/232 |
| 2004/0263060 A1 * | 12/2004 | Gilmour et al. | ............... | 313/501 |
| 2005/0111100 A1 * | 5/2005 | Mather et al. | ................. | 359/464 |
| 2006/0164528 A1 * | 7/2006 | Harrold et al. | ............... | 348/276 |
| 2007/0058258 A1 * | 3/2007 | Mather et al. | ................. | 359/619 |
| 2007/0165035 A1 * | 7/2007 | Duluk et al. | .................. | 345/506 |
| 2008/0225114 A1 * | 9/2008 | De Zwart et al. | ............... | 348/51 |
| 2008/0259233 A1 * | 10/2008 | Krijn et al. | ..................... | 349/15 |
| 2010/0134599 A1 * | 6/2010 | Billert et al. | .................... | 348/48 |

FOREIGN PATENT DOCUMENTS

JP     2007-17634 A     1/2007

OTHER PUBLICATIONS

Communication, dated Aug. 26, 2013, issued by the Korean Intellectual Property Office in counterpart Korean Patent Application No. 10-2007-0063810.

* cited by examiner

*Primary Examiner* — Peling Shaw
(74) *Attorney, Agent, or Firm* — Sughrue Mion, PLLC

(57) ABSTRACT

A method and apparatus for displaying a multiview autostereoscopic image are provided. The apparatus, for displaying an autostereoscopic image, includes: a light source unit; and a display panel which displays an image by modulating light from the light source unit and having a plurality of pixel groups, wherein each of the pixel groups comprises a plurality of whole pixels and at least one fraction pixel, and in each of the whole pixels and the fraction pixel, image information of a viewpoint different from each other is displayed.

8 Claims, 6 Drawing Sheets

MULTIVIEW AUTOSTEREOSCOPIC DISPLAY DEVICE AND MULTIVIEW AUTOSTEREOSCOPIC DISPLAY METHOD

CROSS-REFERENCE TO RELATED PATENT APPLICATIONS

This application claims priority from Korean Patent Application No. 10-2007-0063810, filed on Jun. 27, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to displaying a multiview autostereoscopic image, and more particularly, to displaying a multiview autostereoscopic image in which reduction of resolution occurring when a multiview image is displayed is improved by increasing the number of images that are perceived by a viewer so that the number of the perceived images can be greater than the number of images that are displayed on a display panel.

2. Description of the Related Art

One of the methods of providing an autostereoscopic image is a binocular disparity method in which the viewing zones of a left eye image and a right eye image of a stereopair are separated in order to make each of the left eye and the right eye of a viewer see a different image, thereby providing a 3-dimensional (3D) image. Since an apparatus, for viewing such a 3-D image, provides only an image of two viewpoints, the area that can be viewed by a viewer is very limited. Accordingly, when the head of the viewer moves, the left image and the right image become switched, thereby causing inconvenience in viewing the 3D image.

As a method of expanding the viewable area of a viewer and allowing the viewer to see an autostereoscopic image even when the head of the viewer moves, a method of spatially or temporally sequentially displaying plane images, which are seen from a plurality of viewpoints, on a display device can be performed. According to this method, multiview images, which are space or time multiplexed and displayed on a display device, are made to form an independent viewing zone. When the eyes of the viewer move, the eyes are made to see a viewing zone based on another image seen from another viewpoint, thereby allowing 3D image recognition.

FIG. 1A is a schematic diagram illustrating a structure of a related art autostereoscopic display apparatus 10 for displaying a multiview autostereoscopic image, and FIG. 1B is a diagram illustrating a composition in which image data units are spatially separated and displayed on a display panel 30 illustrated in FIG. 1A according to related art technology.

Referring to FIG. 1A, the related art autostereoscopic display apparatus 10 includes a light source unit 20 formed with first through sixth point light sources 21 through 26, and the display panel 30 spatially dividing and displaying images of multiple viewpoints. The display panel 30 is formed by first through sixth small cells 31 through 36. An image of multiple viewpoints is spatially divided and displayed on each small cell 31 through 36. Referring to FIG. 1B, for example, if it is assumed that first through fifth viewing zone images (a, b, c, d, e) are each formed with six pixel data units, the first pixel data unit of each viewing zone image is displayed in the first small cell 31. Likewise, the second through sixth pixel data units of each viewing zone image are displayed in the second through sixth small cells, respectively. Accordingly, the light in each of the first through sixth point light sources 21 through 26, displays image information displayed by each small cell 31 through 36 in a separate viewing zone. As a result, the viewer sees a different viewpoint image according to a viewing zone, thereby recognizing a 3D image.

Since this structure spatially divides and uses the pixels of a display panel, the resolution of the structure is one fifth of the resolution of the panel. As the number of viewpoints increases, reduction in the resolution decreases equally. In order to improve this problem, a method of temporally and sequentially displaying images of multiple viewpoints on a display panel in order to maintain the resolution of the panel without change can be utilized. However, for this method, a high-speed response display panel is required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Aspects of the present invention provide an autostereoscopic display apparatus and method capable of preventing the reduction of resolution in a multiview autostereoscopic display without having to use a high-speed device.

According to an aspect of the present invention, there is provided an apparatus for displaying an autostereoscopic image including: a light source unit; and a display panel which displays an image by modulating light from the light source unit and has a plurality of pixel groups, wherein a pixel group of the plurality of pixel groups includes a plurality of whole pixels and at least one fraction pixel, and in each whole pixel of the plurality of whole pixels and the at least one fraction pixel, image information of a viewpoint different from each other is displayed.

A width of the at least one fraction pixel in a horizontal direction may be less than a width of a whole pixel, of the plurality of whole pixels, in the horizontal direction.

A width of the at least one fraction pixel in a vertical direction may be less than a width a whole pixel, of the plurality of whole pixels, in the vertical direction.

A width of a whole pixel of the plurality of whole pixels may be a multiple of a width of the at least one fraction pixel.

The light source unit may include a plurality of point light sources corresponding to respective pixel groups of the plurality of pixel groups.

According to another aspect of the present invention, there is provided a method of displaying a multiview autostereoscopic image including: directing light to a plurality of viewing zones; modulating the light and displaying an image of a plurality of viewpoints on a display panel, wherein the display panel has a plurality of pixel groups, and each pixel group of the plurality of pixel groups includes a plurality of whole pixels and at least one fraction pixel, and in each whole pixel of the plurality of whole pixels and the at least one fraction pixel, image information of a viewpoint different from each other is displayed.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Figure 1A:
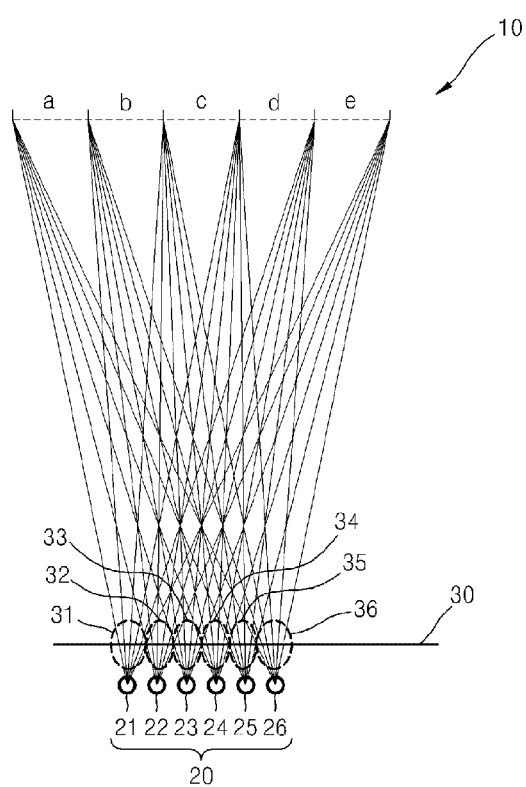
FIG. 1A is a schematic diagram illustrating a structure of a related art autostereoscopic display apparatus for displaying a multiview autostereoscopic image.
Figure 1B:
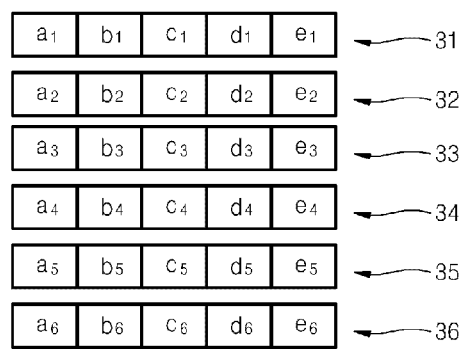
FIG. 1B is a diagram illustrating a composition in which image data units are spatially separated and displayed on a display panel illustrated in FIG. 1A according to related art technology.

The present invention will now be described more fully with reference to the accompanying drawings, in which exemplary embodiments of the invention are shown. In the drawings, whenever the same element reappears in subsequent drawings, it is denoted by the same reference numeral. Though the drawings illustrate exemplary embodiments of the present invention, the drawings are not drawn according to a reduced scale, and the thicknesses of layers and regions may be exaggerated for clarity.

Figure 2A:
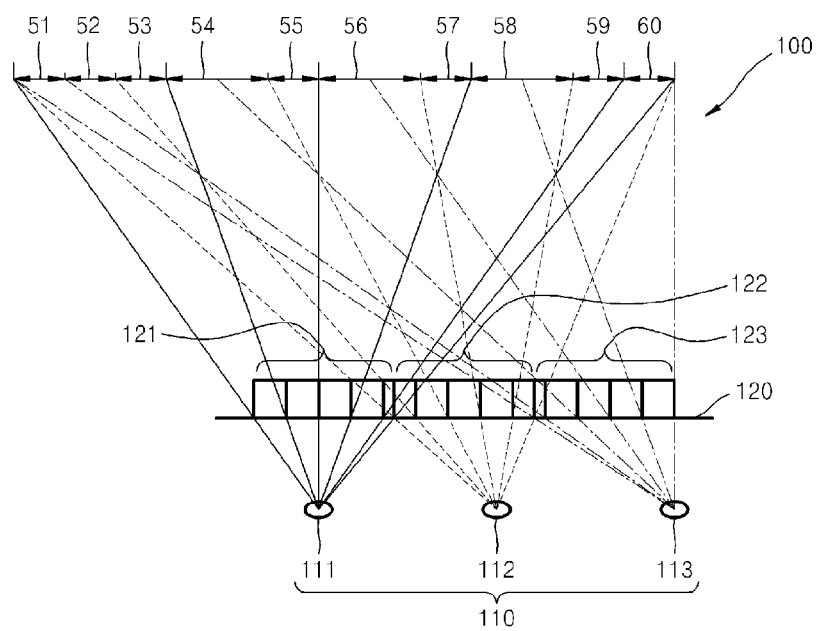
FIG. 2A is a schematic diagram illustrating a structure of an autostereoscopic image display apparatus for displaying a multiview autostereoscopic image and a displaying method, according to an exemplary embodiment of the present invention.
Figure 2B:
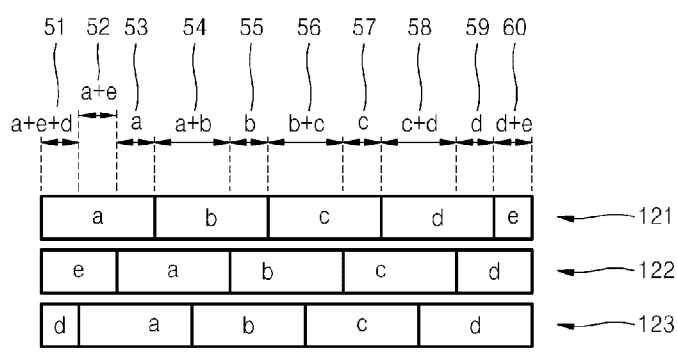
FIG. 2B is a diagram illustrating a method of displaying image information of a plurality of viewpoints in a pixel group forming a display panel illustrated in FIG. 2A, according to an exemplary embodiment of the present invention.

FIG. 2A is a schematic diagram illustrating a structure of an apparatus for displaying a multiview autostereoscopic image and a displaying method, according to an exemplary embodiment of the present invention, and FIG. 2B is a diagram illustrating a method of displaying image information of a plurality of viewpoints in a pixel group forming a display panel illustrated in FIG. 2A, according to an exemplary embodiment of the present invention. Referring to FIGS. 2A and 2B, an autostereoscopic image display apparatus 100, for displaying an autostereoscopic image, includes a light source unit 110 and a display panel 120. The display panel 120 modulates light and forms an image, and, for example, a liquid crystal display (LCD) panel may be employed as the display panel 120. The display panel 120 includes a plurality of pixel groups. For example, the display panel 120 includes a first pixel group 121, a second pixel group 122, and a third pixel group 123. Each of the first through third pixel groups 121 through 123 includes a plurality of whole pixels and at least one fraction pixel. The width of a whole pixel may be a multiple of the width of a fraction pixel. The first pixel group 121 is formed with four whole pixels and one fraction pixel, and the fifth pixel is the fraction pixel of which the width is one third of the width of one of the whole pixels. The second pixel group 122 is formed with three whole pixels and two fraction pixels, such that the first pixel and the fifth pixel are fraction pixels. The width of each of the fraction pixels is two thirds of the width of one of the whole pixels. The third pixel group 123 is formed with four whole pixels and one fraction pixel such that the first pixel is the fraction pixel and the width of the fraction pixel is one third of the width of one of the whole pixels. In the whole pixels and fraction pixels forming each pixel group 121 through 123, image information (a, b, c, d, e) of different viewpoints is displayed. The light source unit 110 provides light to the whole pixels and fraction pixels forming each of the first through third pixel groups 121 through 123 so that the lights modulated in the whole pixels and the fraction pixels can be directed to viewing zones which are different each other according to the pixels in which the lights are modulated. For this, the light source unit 110 is composed of a plurality of first through third point light sources 111 through 113 corresponding to the first through third pixel groups 121 through 123, respectively. However, the present invention is not limited thereto and this structure is just an example and any structure in which light is supplied to each pixel forming the first through third pixel groups 121 through 123 of the display panel 120 and the modulated lights in the pixels can be directed to a viewing zone different each other according to the pixels in which the lights are modulated, can be applied as the light source unit 110. For example, the light source unit 110 may be formed by a surface light source and a lenticular lens array that separates parallel light emitted from the surface light source into a plurality of viewing zones.

A method of displaying a multiview autostereoscopic image in the autostereoscopic image display apparatus 100 will now be explained. The light from the first through third point light sources 111 through 113 is applied to the pixels forming the first through third pixel groups 121 through 123, respectively. The light passing through each of the pixels forming the first pixel group 121 is modulated by image information (a, b, c, d, e) of different viewpoints, and thus, the first through fourth pixels are the whole pixels that modulate the light according to the image information corresponding to a, b, c, and d, respectively, and the fifth pixel is the fraction pixel that modulates the image information corresponding to e. Likewise, the light passing through the first through fifth pixels of the second pixel group 122 is modulated by the image information corresponding to e, a, b, c, and d, respectively, and the light passing through the first through fifth pixels of the third group 123 is modulated by the image information corresponding to d, a, b, c, and d, respectively.

In this case, the light, which is modulated according to image information by passing through the pixels forming the first through third pixel groups 121 through 123, forms three sets of five viewing zones. However, since each of the first through third pixel groups 121 through 123 includes one or more fraction pixels, the intervals between the adjacent pixels are not uniform, and therefore the each set of five viewing zones that is formed by each of the first through third pixel groups 121 through 123 are not identical. That is, even though light is modulated in the display panel 120 according to the image information of the five viewpoints, the number of viewing zones formed by the modulated light is greater than five.

More specifically, the lights modulated in the first pixel of the first pixel group 121, the first pixel of the second pixel group 122, and the first pixel of the third pixel group 123 form a first viewing zone 51 in which the viewer recognizes an image of a+e+d. The lights modulated in the first pixel of the first pixel group 121, the first pixel of the second pixel group 122, and the second pixel of the third pixel group 123 form a second viewing zone 52 in which the viewer recognizes an image of a+e. According to this principle, third through tenth viewing zones 53 through 60 are formed such that the viewer perceives a different image in each of the third through tenth viewing zones 53 through 60. Thus, the light is modulated in the display panel 120 according to the image information of the five viewpoints, however, the viewer perceives the images of 10 viewpoints separated into the first through tenth viewing zones 51 through 60.

Figure 3A:
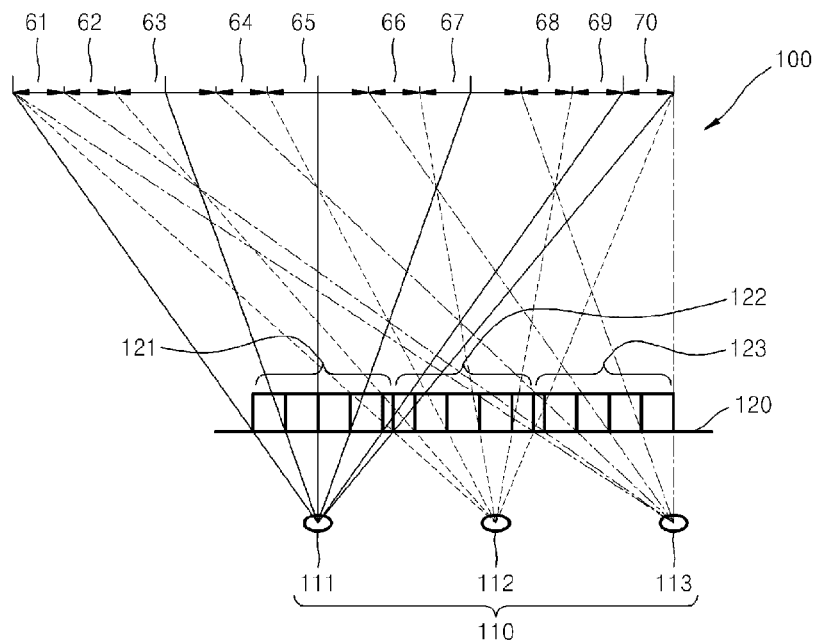
FIGS. 3A and 3B are diagrams explaining a method of displaying a multiview autostereoscopic image according to another exemplary embodiment of the present invention.
Figure 3B:
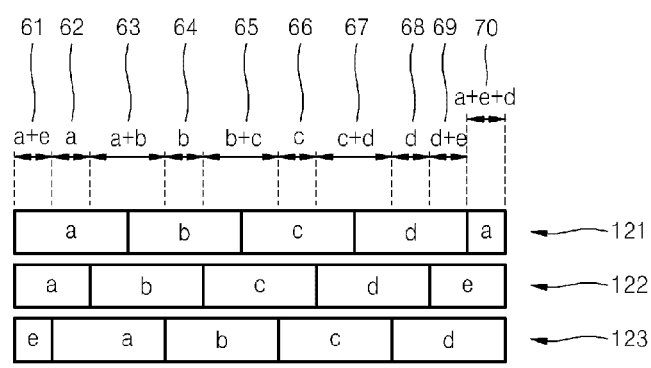

FIGS. 3A and 3B are diagrams explaining a method of displaying a multiview autostereoscopic image according to another exemplary embodiment of the present invention. The method of displaying a multiview autostereoscopic image according to the current exemplary embodiment is different from the method of the previous exemplary embodiment in that a method of spatially dividing the image information for modulating light in the display panel 120 is different. The first through fourth pixels forming the first pixel group 121 are whole pixels modulating light according to image information corresponding to a, b, c, and d, respectively. The fifth pixel is a fraction pixel and modulates light according to the image information corresponding to a, again. The first pixel forming the second pixel group 122 is a fraction pixel and modulates light according to the image information corresponding to a. The second through fourth pixels are whole pixels modulating light according to image information corresponding to b, c, and d, respectively. The fifth pixel is a fraction pixel and modulates light according to the image information corresponding to e. The first pixel forming the third pixel group 123 is a fraction pixel and modulates light according to the image information corresponding to e. The second through fifth pixels are whole pixels modulating light according to image information corresponding to a, b, c, and d, respectively. The lights, which are modulated by passing through the first through third pixel groups 121 through 123, form three sets of five viewing zones. Since the three sets of five viewings zones are not identical because of the fraction pixels of the first through third pixel groups 121 through 123, the first through tenth viewing zones 61 through 70 are formed such that the viewer perceives a different image in each of the first through tenth viewing zones 61 through 70. Thus, the light is modulated in the display panel 120 according to the image information of the five viewpoints, however the viewer perceives the images of 10 viewpoints separated into the first through tenth viewing zones 61 through 70.

Figure 4A:
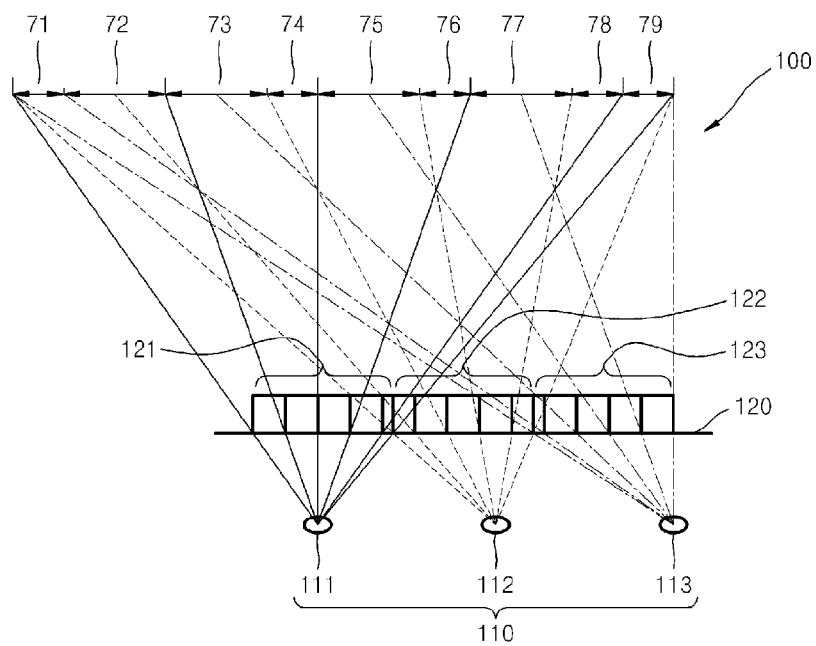
FIGS. 4A and 4B are diagrams explaining a method of displaying a multiview autostereoscopic image according to another exemplary embodiment of the present invention.
Figure 4B:
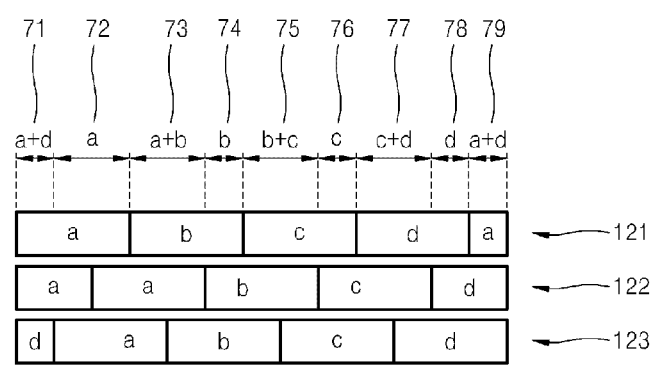

FIGS. 4A and 4B are diagrams explaining a method of displaying a multiview autostereoscopic image according to another exemplary embodiment of the present invention.

The method of displaying a multiview autostereoscopic image according to the current exemplary embodiment is different from the methods of the previous exemplary embodiments in that a method of spatially dividing the image information for modulating light in the display panel 120 is different. The first through fifth pixels forming the first pixel group 121 modulate light according to image information corresponding to a, b, c, d, and e, respectively. The first through fifth pixels forming the second pixel group 122 modulate light according to image information corresponding to a, a, b, c, and d, respectively.

The first through fifth pixels forming the third pixel group 123 modulate light according to image information corresponding to d, a, b, c, and d, respectively. The lights, which are modulated by passing through the first through third pixel groups 121 through 123, form three sets of five viewing zones and the three sets of five viewing zones are not identical because of fraction pixels, and thus, the first through ninth viewing zones 71 through 79 are formed such that the viewer perceives a different image in each of the first through ninth viewing zones 71 through 79. That is, the light is modulated in the display panel 120 according to the image information (a, b, c, d) of the four viewpoints, however the viewer perceives the images of 9 viewpoints separated into the first through ninth viewing zones 71 through 79.

Figure 5A:
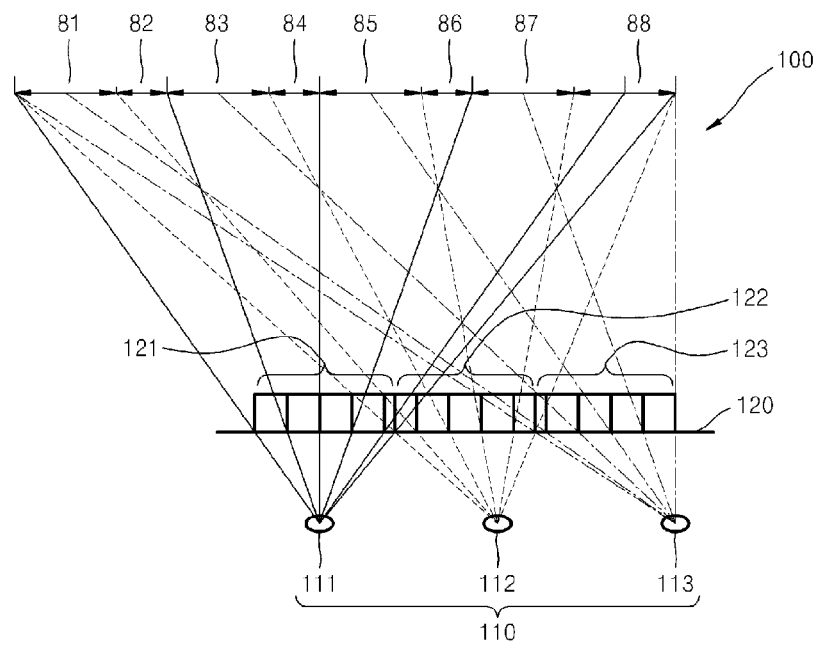
FIGS. 5A and 5B are diagrams explaining a method of displaying a multiview autostereoscopic image according to another exemplary embodiment of the present invention.
Figure 5B:
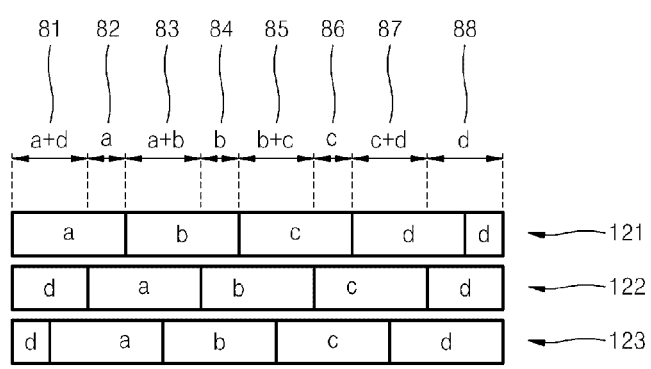

FIGS. 5A and 5B are diagrams explaining a method of displaying a multiview autostereoscopic image according to another exemplary embodiment of the present invention. The method of displaying a multiview autostereoscopic image according to the current exemplary embodiment is different from the methods of the previous exemplary embodiments in that a method of spatially dividing the image information for modulating light in the display panel 120 is different.

The first through fifth pixels forming the first pixel group 121 modulate light according to image information corresponding to a, b, c, d, and d, respectively. The first through fifth pixels forming a second pixel group 122 modulate light according to image information corresponding to d, a, b, c, and d, respectively.

The first through fifth pixels forming the third pixel group 123 modulate light according to image information corresponding to d, a, b, c, and d, respectively. The lights, which are modulated by passing through the first through third pixel groups 121 through 123, form three sets of five viewing zones which are different from each other because of fraction pixels, and thus, the first through eighth viewing zones 81 through 88 are formed such that the viewer perceives a different image in each of the first through eighth viewing zones 81 through 88. That is, the light is modulated in the display panel 120 according to the image information (a, b, c, d) of the four viewpoints, however the viewer perceives the images of 8 viewpoints separated into the first through eighth viewing zones 81 through 88.

Thus, forming of a number of viewing zones greater in number than the number of viewpoints of the image information displayed in the display panel 120 is enabled because each of the first through third pixel groups 121 through 123 forming the display panel 120 includes one or more fraction pixels. In the above description, the number of pixel groups, the number of pixels forming each pixel group, the width or position of a fraction pixel, and image information of multiple viewpoints for modulating light in each of whole pixels and fraction pixels are explained as examples. The present invention can also be executed after being modified in a variety of ways so that the number of viewpoints that are perceived by a viewer can be greater than the number of viewpoints of image information modulating light in a display panel. Also, even though the case in which the width of the fraction pixel is ⅓ or ⅔ of the width of one of the whole pixels is explained above, a structure different from this can also be implemented. In addition, even though the width of the fraction pixel in the horizontal direction is shown to be less than the width of one of the whole pixels in the horizontal direction in the attached drawings, the width of the fraction pixel in the vertical direction may be less than the width of one of the whole pixels in the vertical direction, or the widths of the fraction pixel in the vertical direction and in the horizontal direction may be less than the widths of one of the whole pixels in the vertical direction and in the horizontal direction, respectively.

As described above, the multiview 3D autostereoscopic image display apparatus and display method according to the exemplary embodiments of the present invention are characterized in that each pixel group forming a display panel includes a plurality of whole pixels and one or more fraction pixels, and each of the whole pixels and fraction pixels modulates light according to image information of a viewpoint different from each other. According to this, the number of viewpoints that are perceived by a viewer increases, that is, more than two times the number of viewpoints of image information for modulating light in the display panel. That is, when a multiview autostereoscopic image of an identical viewpoint is displayed, the resolution of the multiview 3D autostereoscopic image display apparatus of the present invention can be more than two times the resolution of the related art structure.

While a multiview autostereoscopic image display apparatus and a displaying method thereof have been particularly shown and described with reference to exemplary embodiments of the present invention, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope should be construed as being included in the present invention.

What is claimed is:

1. An apparatus for displaying an autostereoscopic image comprising:
   a light source unit which includes a plurality of point light sources; and
   a display panel which displays an image by modulating light from the light source unit and has a plurality of pixel groups, each of the pixel groups including a plurality of whole pixels and at least one fraction pixel, and
   wherein each of the plurality of point light sources corresponds to a respective pixel group of the plurality of pixel groups, and
   wherein each of the plurality of whole pixels and at least one fraction pixel of each of the pixel groups is configured to modulate light from at least one of the plurality of light sources according to image information of a viewpoint different from each other.

2. The apparatus of claim 1, wherein a width of the at least one fraction pixel in a horizontal direction is less than a width of a whole pixel, of the plurality of whole pixels, in the horizontal direction.

3. The apparatus of claim 1, wherein a width of the at least one fraction pixel in a vertical direction is less than a width of a whole pixel, of the plurality of whole pixels, in the vertical direction.

4. The apparatus of claim 1, wherein a width of a whole pixel of the plurality of whole pixels is a multiple of a width of the at least one fraction pixel.

5. A method of displaying a multiview autostereoscopic image comprising:
   directing a light emitted by each of a plurality of point light sources to a plurality of viewing zones; and
   modulating the light and displaying an image of a plurality of viewpoints by using a display panel,
   wherein the display panel has a plurality of pixel groups which are arranged in a line which is parallel to the plurality of point light sources, and each pixel group of the plurality of pixel groups includes a plurality of whole pixels and at least one fraction pixel, and
   wherein each of the plurality of point light sources corresponds to a respective pixel group of the plurality of pixel groups, and
   wherein each of the plurality of whole pixels and at least one fraction pixel of each of the pixel groups is configured to modulate light from at least one of the plurality of light sources according to image information of a viewpoint different from each other.

6. The method of claim 5, wherein a width of the at least one fraction pixel in a horizontal direction is less than a width of a whole pixel, of the plurality of whole pixels, in the horizontal direction.

7. The method of claim 5, wherein a width of the at least one fraction pixel in a vertical direction is less than a width of a whole pixel, of the plurality of whole pixels, in the vertical direction.

8. The method of claim 5, wherein a width of a whole pixel of the plurality of whole pixels is a multiple of a width of the at least one fraction pixel.

* * * * *